April 28, 1936.  J. LEDWINKA  2,039,091
VEHICLE WHEEL
Filed May 27, 1932
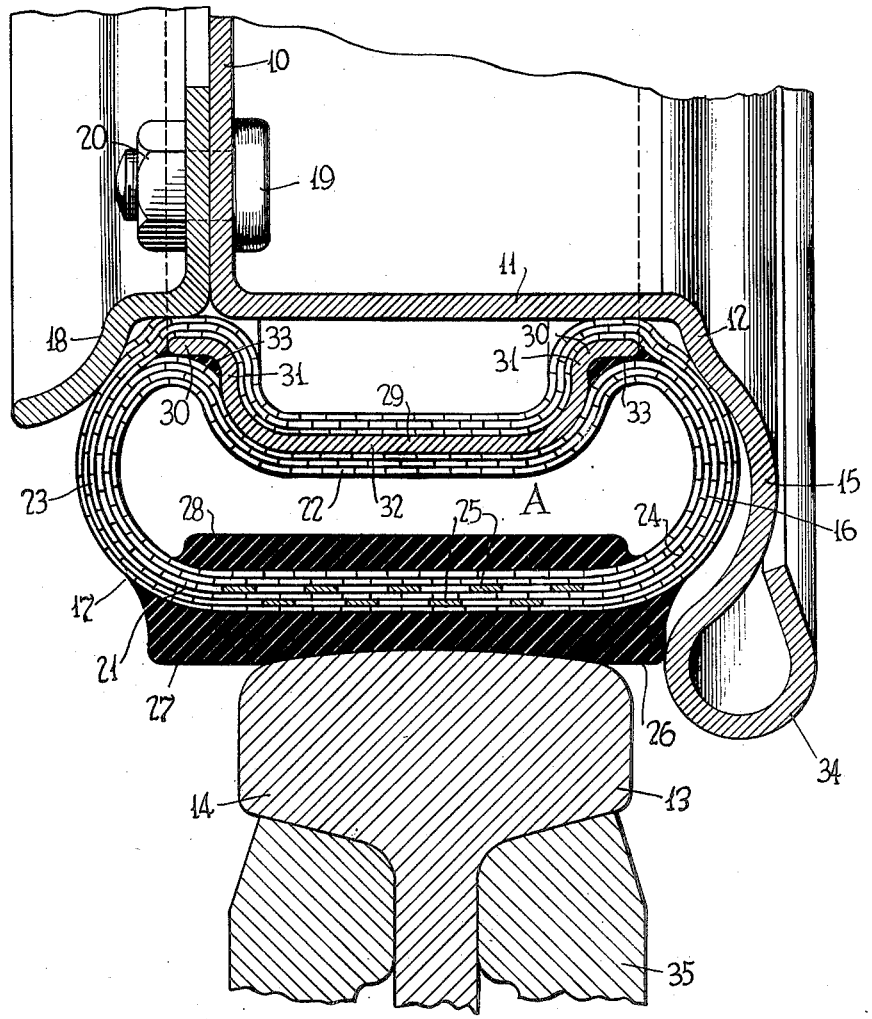
INVENTOR
JOSEPH LEDWINKA.
BY
ATTORNEY Patented Apr. 28, 1936

2,039,091

UNITED STATES PATENT OFFICE 2,039,091

VEHICLE WHEEL

Joseph Ledwinka, Philadelphia, Pa., assignor to Edward G. Budd Manufacturing Company, Philadelphia, Pa., a corporation of Pennsylvania Application May 27, 1932, Serial No. 613,921

7 Claims. (Cl. 295—31)

The invention relates to vehicle wheels having pneumatic tires, and more particularly to pneumatic tired wheels for railway vehicles such as railcars.

The chief consideration in pneumatic tired wheels for use on any roadway or railway, is the prevention, upon deflation of the tire, of an excessive drop of the wheel toward the roadway or rail to avoid the fouling or contacting of the wheel with irregularities of road surfaces or with parts of the track other than the rail head. There have been numerous proposals directed to the elimination of danger from this source, particularly directed to limiting the radial drop of a wheel upon deflation of the tire. My invention comprises an improvement on the devices of the prior art, and has for its chief object the provision of means whereby the prevention of excessive drop may be readily accomplished and made certain.

Other objects, relating to strength and lightness and simplicity of construction will be apparent from a perusal of the subjoined specification in the light of the drawing, in which the figure shown is a transverse cross section of a railway vehicle wheel in combination with a railway track, embodying my invention. Inasmuch as the general application would be the same in the case of vehicle wheels other than for railways, I have preferred to confine my specification to the embodiment shown, with the intention, however, that it shall be couched in such terms, and given such an interpretation as to include all variations.

In the drawing, the main body of the wheel is indicated by the reference numeral 10, and is mounted upon the axle or hub of the railway vehicle (not shown). This body is preferably of sheet metal and is provided with an axially extending cylindrical portion 11, adapted to provide a seat for the tire, and supplanting the usual rim member. Projected from portion 11 is a radially extending retaining flange 12 the function of which as usual in railway vehicles, is the engagement with the inner edge 13 of rail 14 to retain the vehicle upon the trackway and guide it thereover. Flange 12 is provided with an annular outwardly extending bulge 15, to accommodate the inner side wall 16 of the tire 17. Flange 18, also of sheet metal is bolted to the main body 10 adjacent its outer periphery by bolts 19 and nuts 20, arranged in an annular series.

The radially outer wall 21 of the tire 17 is substantially cylindrical and in concentric spaced relationship to the radially inner wall 22, and outer side wall 23 is of substantially the same curvature as inner wall 16. The tire consists chiefly of bands of fabric or tension-resisting material 24 wound transversely of the tire. The tire 17 embodies in addition to transverse winding 24 in the radially outer wall 21 an annular winding 25 wound continuously or otherwise circumferentially of the outer wall. This winding is preferably of tape, metal, or fabric, and is of substantially uniform diameter and of such strength as to preclude expansion beyond a determinate diameter and thereby limits the expansion of the tire under all conditions of pressure to a pre-determined diameter and likewise to restrict the shape of the outer peripheral wall to a cylindrical shape of determinate diameter.

The tread 26 of, the wheel which bears on the track is provided with a large mass of solid rubber 27 to take the wear and to provide a cushioning effect. This outer tread surface may be vulcanized to the transverse fabric windings 24 in accordance with preferred methods of tire manufacture. A similar mass of solid rubber 28 of cylindrical section may be vulcanized to the inner surface of windings 24 to restrict the degree of radial drop of the wheel toward the rail upon deflation. The available air space between the walls and rubber 28 is indicated by letter A.

In order to further limit the drop of the wheel, or to form the sole limiting means, if desired, I have provided a metal annulus 29, of channel section presenting radially inwardly, its edges being flanged axially outwardly as at 30. The corners between the side walls 31 and the flanges 30 and the bottom 32 of the channel are of ample radius, so as to prevent injury to the transverse windings 24, which are preferably formed about the annulus 29 on both sides thereof.

Annulus 29 is supported away from disc 11 and flange 18 by the inner series of windings 24, and is held in constant relation to the windings by being vulcanized thereto as at 33. Being thus covered and secured to the transverse windings 24, the annulus 29 actually forms an integral part thereof, and effectually decreases the difference between the inner diameter of the inner tread 28, and the outer effective diameter of the radially inner wall 22 of windings 24.

By thus decreasing the difference between the two relatively adjacent cylindrical surfaces, I have provided a highly efficient means for preventing excessive radial drop of the wheel and particularly flange 12 toward rail 14 upon deflation and escape of the air under pressure in space A. The possibility of the outer peripheral bead 34 of flange 12 striking parts of the railway other than the side 13 of the rail head, such as fish plates 35, or fish plate bolts (not shown) is precluded. Thus, a railcar provided with my improved wheels, may continue on deflated tires uninterruptedly to its destination without the necessity of changing wheels and tires enroute, or without any possible danger to the car or its occupants.

It will be seen that the interposition of the metallic annulus 29, enables me to so limit the radial drop of the wheel as to preclude any possibility of striking fish plates, etc. It further allows the continued operation of the vehicle upon the roadway or railway as the case may be. The other objects, relating to strength and lightness, should be apparent from the use of sheet metal and the efficiency of the sections used.

Modifications of my invention may be made without departing from the spirit thereof, and I therefore do not wish to be limited by the circumstantial terminology of the specification, but rather solely by the scope of the appended claims.

What I claim is:—

1. A wheel for rail vehicles comprising a rim base and a retaining flange adapted to engage the side of a rail, in combination with a pneumatic tire seated on said rim base and having a continuous circumferential wall, the outer tread wall being substantially transversely flat and provided with means for retaining it in this flat condition, the side walls curved outwardly, and the inner wall in its central portion offset radially toward the outer wall and means for positively constraining it to this offset relation, whereby the air space within the tire has the form of two lateral lobes interconnected by a radially shallow central portion, the depth of this central portion being such as to confine the drop of the wheel upon deflation to a distance less than the normal distance between the retaining flange and parts of the track located laterally of the rail head and extending into the vertical plane of the flange.

2. A tire for use on rail vehicles comprising a continuous circumferential wall, the outer tread wall being substantially transversely flat and means associated therewith for constraining it to this condition, the side walls being outwardly curved, and the inner wall in its central portion being offset radially toward the outer wall and constrained to this offset relation by means embedded in the inner wall, whereby the air space within the tire has the form of two lateral lobes interconnected by a radially shallow central portion.

3. A wheel for rail vehicles comprising a rim base and a retaining flange adapted to engage the side of a rail, in combination with a pneumatic tire seated on said rim base and having a continuous circumferential wall, the inner and side walls being of substantially uniform thickness throughout, the outer tread wall having means associated therewith for preventing its expansion radially beyond the flange, the inner wall in its central portion being offset radially outwardly toward the outer wall and means for positively constraining it to this offset relation, whereby the radial depth of the air space between said outer wall and the offset of said inner wall is materially less than the depth of said air space laterally of said offset and whereby, in the event of deflation, the drop of the wheel is held within a distance less than the normal distance between the retaining flange and parts of the track located laterally of the rail head and extending into the vertical plane of the flange.

4. A wheel for rail vehicles comprising a rim base and a retaining flange adapted to engage the side of a rail, in combination with a pneumatic tire seated on said rim base and having a continuous circumferential wall, the inner and side walls being of substantially uniform thickness throughout, the outer tread wall having means associated therewith for preventing its expansion radially beyond the flange, the inner wall in its central portion being offset radially outwardly toward the outer wall, a transversely arched metal annulus supported on the rim base for positively constraining said inner wall to this offset relation, and for confining the drop of the wheel upon deflation of the tire within a distance less than the normal distance between the retaining flange and parts of the track located laterally of the rail head and extending into the vertical plane of the flange.

5. A tire for use on rail vehicles comprising a continuous circumferential wall, including a substantially transversely flat outer tread wall provided with means for retaining it in this flat condition, bulged out side walls, and an inner wall adapted to seat on a rim, said inner wall in its central portion being offset radially outwardly toward the tread wall to constrict the air space between lateral lobe portions and limit the drop of the tread upon deflation, said inner wall being constrained to this offset relation by an arched metal annulus embedded in the tire wall.

6. In combination in a rail-car wheel, a rim including a base and a rail side retaining flange having a side recess, and a pneumatic tire seated on the base having a continuous circumferential wall, the outer tread wall being transversely substantially flat and including means retaining it flat, the side walls being curved outwardly with the inner side wall opposite the side recess, and the inner wall in its central portion being offset radially toward the outer wall and including means positively constraining it to this offset relation whereby the air space within the tire has the form of two lateral lobes interconnected by means including a radially shallow central portion, the depth of which is such as to confine the drop of the flange upon deflation within a distance less than the normal distance between the retaining flange and parts of the track located laterally of the rail head and extending into the vertical plane of the flange.

7. A pneumatic tire for use on rail vehicles comprising a continuous circumferential wall, the outer tread wall being substantially transversely flat and means associated therewith for constraining it to this condition, the side walls being outwardly curved, and the inner wall in its central portion being offset radially outwardly toward the outer wall, the tire being self-sustaining in this form, the walls being so formed that the air space within the tire has the form of two lateral radially inwardly extending lobes interconnected by a central portion of substantially less radial depth than the lobes.

JOSEPH LEDWINKA.